US012143466B2

(12) United States Patent
Micciancio et al.

(10) Patent No.: US 12,143,466 B2
(45) Date of Patent: Nov. 12, 2024

(54) INTERACTIVE BOOTSTRAPPING FOR APPROXIMATE HOMOMORPHIC ENCRYPTION

(71) Applicant: Duality Technologies, Inc., Maplewood, NJ (US)

(72) Inventors: Daniele Micciancio, San Diego, CA (US); Yuriy Polyakov, Fair Lawn, NJ (US); Vinod Vaikuntanathan, Boston, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 225 days.

(21) Appl. No.: 17/964,335

(22) Filed: Oct. 12, 2022

(65) Prior Publication Data

US 2023/0112840 A1 Apr. 13, 2023

Related U.S. Application Data

(60) Provisional application No. 63/255,062, filed on Oct. 13, 2021.

(51) Int. Cl.
*H04L 9/00* (2022.01)
*H04L 9/06* (2006.01)
*H04L 9/08* (2006.01)

(52) U.S. Cl.
CPC ............ *H04L 9/008* (2013.01); *H04L 9/0643* (2013.01); *H04L 9/085* (2013.01)

(58) Field of Classification Search
CPC ........ H04L 9/008; H04L 9/0643; H04L 9/085
See application file for complete search history.

(56) References Cited

U.S. PATENT DOCUMENTS

| | | | | |
|---|---|---|---|---|
| 8,515,058 B1* | 8/2013 | Gentry | ................... | H04L 9/008 380/28 |
| 8,914,626 B1* | 12/2014 | Adogla | ................. | G06F 9/4401 709/227 |
| 10,153,894 B2* | 12/2018 | Laine | ...................... | G06F 7/483 |
| 10,594,472 B2* | 3/2020 | Ding | ...................... | H04L 9/008 |
| 2019/0334694 A1* | 10/2019 | Chen | ...................... | H04L 9/008 |
| 2022/0052834 A1* | 2/2022 | Vaikuntanathan | ...... | H04L 9/008 |
| 2023/0112840 A1* | 4/2023 | Micciancio | ............. | H04L 9/085 713/189 |
| 2023/0325529 A1* | 10/2023 | Sav | ........................ | H04L 9/0891 726/26 |
| 2023/0344617 A1* | 10/2023 | Cheon | ................... | H04L 9/3026 |
| 2023/0361986 A1* | 11/2023 | Genise | ................. | G06F 9/3887 |

* cited by examiner

*Primary Examiner* — Ramy M Osman

(74) *Attorney, Agent, or Firm* — PEARL COHEN ZEDEK LATZER BARATZ LLP

(57) ABSTRACT

Systems and methods for distributing bootstrapping in homomorphic encryption schemes include: splitting a decryption key into a plurality of n shares; transmitting to each of a plurality of n computer processors: (i) a ciphertext; (ii) a unique share of the plurality of n shares of the decryption key; and (iii) an indication of a publicly available encryption key; receiving, from each of the plurality of n computer processors, n encrypted values; and computing a homomorphic sum of the n encrypted values to obtain an encryption of the sum of n decrypted values, such that bootstrapping of the encryption is distributed.

17 Claims, 4 Drawing Sheets

302 — SPLITTING, BY A SERVER, A DECRYPTION KEY INTO A PLURALITY OF $n$ SHARES

304 — TRANSMITTING, BY THE SERVER, TO EACH OF A PLURALITY OF $n$ COMPUTER PROCESSORS: (I) A CIPHERTEXT, WHEREIN THE CIPHERTEXT IS ENCRYPTED USING HOMOMORPHIC ENCRYPTION; (II) A UNIQUE SHARE OF THE PLURALITY OF $n$ SHARES OF THE DECRYPTION KEY; AND (III) AN INDICATION OF A PUBLICLY AVAILABLE ENCRYPTION KEY

306 — RECEIVING, BY THE SERVER, FROM EACH OF THE PLURALITY OF $n$ COMPUTER PROCESSORS, $n$ ENCRYPTED VALUES

308 — COMPUTING, BY THE SERVER, A HOMOMORPHIC SUM OF THE $n$ ENCRYPTED VALUES TO OBTAIN AN ENCRYPTION OF THE SUM OF $n$ DECRYPTED VALUES, SUCH THAT A BOOTSTRAPPING OF THE ENCRYPTION IS DISTRIBUTED

INTERACTIVE BOOTSTRAPPING FOR APPROXIMATE HOMOMORPHIC ENCRYPTION

CROSS-REFERENCE TO RELATED APPLICATIONS

This application claims the benefit of and priority to U.S. Provisional Patent Application No. 63/255,062 filed Oct. 13, 2021, which is owned by the assignee of the instant application and incorporated herein by reference in its entirety.

FIELD OF THE INVENTION

The invention relates generally to improving homomorphic encryption. In particular, embodiments of the invention may allow for distributing bootstrapping in homomorphic encryption schemes across multiple computer processors.

BACKGROUND

Homomorphic encryption can allow mathematical operations (such as addition and/or multiplication) to be performed on encrypted data to yield an encrypted result. Encrypted results can be decrypted to a same result obtained if the operations had been performed on the plaintext, un-encrypted data.

Bootstrapping can be an important operation in homomorphic encryption schemes and/or when performing operations on homomorphically encrypted data. For example, bootstrapping can turn approximate homomorphic encryption schemes into fully homomorphic encryption schemes and/or reduce a noise of the encryption. Typically, bootstrapping is computationally intensive. As such, it can be desirable to perform computationally efficient bootstrapping in homomorphic encryption.

SUMMARY

According to one or more embodiments, there is provided a computer implemented method for distributing bootstrapping in homomorphic encryption schemes, the method including: splitting, by a server, a decryption key into a plurality of n shares; transmitting, by the server, to each of a plurality of n computer processors: (i) a ciphertext, wherein the ciphertext is encrypted using homomorphic encryption; (ii) a unique share of the plurality of n shares of the decryption key; and (iii) an indication of a publicly available encryption key; receiving, by the server, from each of the plurality of n computer processors, n encrypted values, wherein each of the n encrypted values is a re-encryption of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors; and computing, by the server, a homomorphic sum of the n encrypted values to obtain an encryption of the sum of n decrypted values, such that a bootstrapping of the encryption is distributed.

According to some embodiments, each of the plurality of n computer processors are located on the server.

According to some embodiments, each of the plurality of n computer processors are located on a same second server.

According to some embodiments, each of the plurality of n computer processors are located on a corresponding plurality of n different servers.

According to some embodiments, each of the plurality of n different servers are semi-honest servers.

According to some embodiments, the ciphertext is encrypted using the Cheon-Kim-Kim-Song (CKKS) approximate homomorphic encryption scheme.

According to some embodiments, the ciphertext comprises a pair of ring elements from a cyclotomic ring.

According to some embodiments, the ciphertext is decrypted by each of the plurality of n computer processors using the unique share of the plurality of n shares of the decryption key transmitted to the plurality of n computer processors, and a modulus, wherein the modulus is different for each of the plurality of n computer processors.

According to some embodiments, each of the n encryption values are independent of the decryption key.

According to some embodiments, the decryption of the ciphertext is rounded if an absolute value of the decryption of the ciphertext is greater than a predefined value.

According to some embodiments, the server transmits, to each of the plurality of n computer processors, a hash function, and the decryption of the ciphertext includes the hash function.

According to one or more embodiments there is provided a system for distributing bootstrapping in homomorphic encryption schemes, the system including: a server; and a plurality of n computer processors, wherein the server is configured to: split a decryption key into a plurality of n shares; transmit, to each of the plurality of n computer processors: (i) a ciphertext, wherein the ciphertext is encrypted using homomorphic encryption; (ii) a unique share of the plurality of n shares of the decryption key; and (iii) an indication of a publicly available encryption key; receive, from each of the plurality of n computer processors, n encrypted values; and compute a homomorphic sum of the n encrypted values to obtain an encryption of the sum of n decrypted values.

According to some embodiments, each of the n encrypted values is a re-encryption of a decryption of the ciphertext, and each of the plurality of n computer processors are configured to: perform the re-encryption using the publicly available encryption key; and perform the decryption of the ciphertext using the unique share of the plurality of n shares of the decryption key transmitted to the plurality of n computer processors.

According to some embodiments, each of the plurality of n computer processors are located on the server.

According to some embodiments, each of the plurality of n computer processors are located on a same second server.

According to some embodiments, each of the plurality of n computer processors are located on a corresponding plurality of n different servers.

According to some embodiments, each of the plurality of n computer processors are configured to round the decryption of the ciphertext if an absolute value of the decryption of the ciphertext is greater than a predefined value.

According to some embodiments, each of the plurality of n computer processors are configured to: decrypt the ciphertext using the unique share of the plurality of n shares of the decryption key transmitted to the plurality of n computer processors, and a modulus, wherein the modulus is different for each of the plurality of n computer processors.

According to some embodiments, the server is configured to transmit, to each of the plurality of n computer processors, a hash function to be used in the decryption of the ciphertext.

According to one or more embodiments there is provided a computer program product containing instructions which when executed by at least one processor in a server cause the at least one server to: split a decryption key into a plurality of n shares; transmit, to each of a plurality of n computer processors: (i) a ciphertext, wherein the ciphertext is encrypted using homomorphic encryption; (ii) a unique share of the plurality of n shares of the decryption key; and (iii) an indication of a publicly available encryption key; receive, from each of the plurality of n computer processors, n encrypted values; and compute a homomorphic sum of the n encrypted values to obtain an encryption of the sum of n decrypted values.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

FIG. 3 is a flowchart showing a method for distributing bootstrapping in homomorphic encryption schemes, according to some embodiments of the invention.

Figure 1:
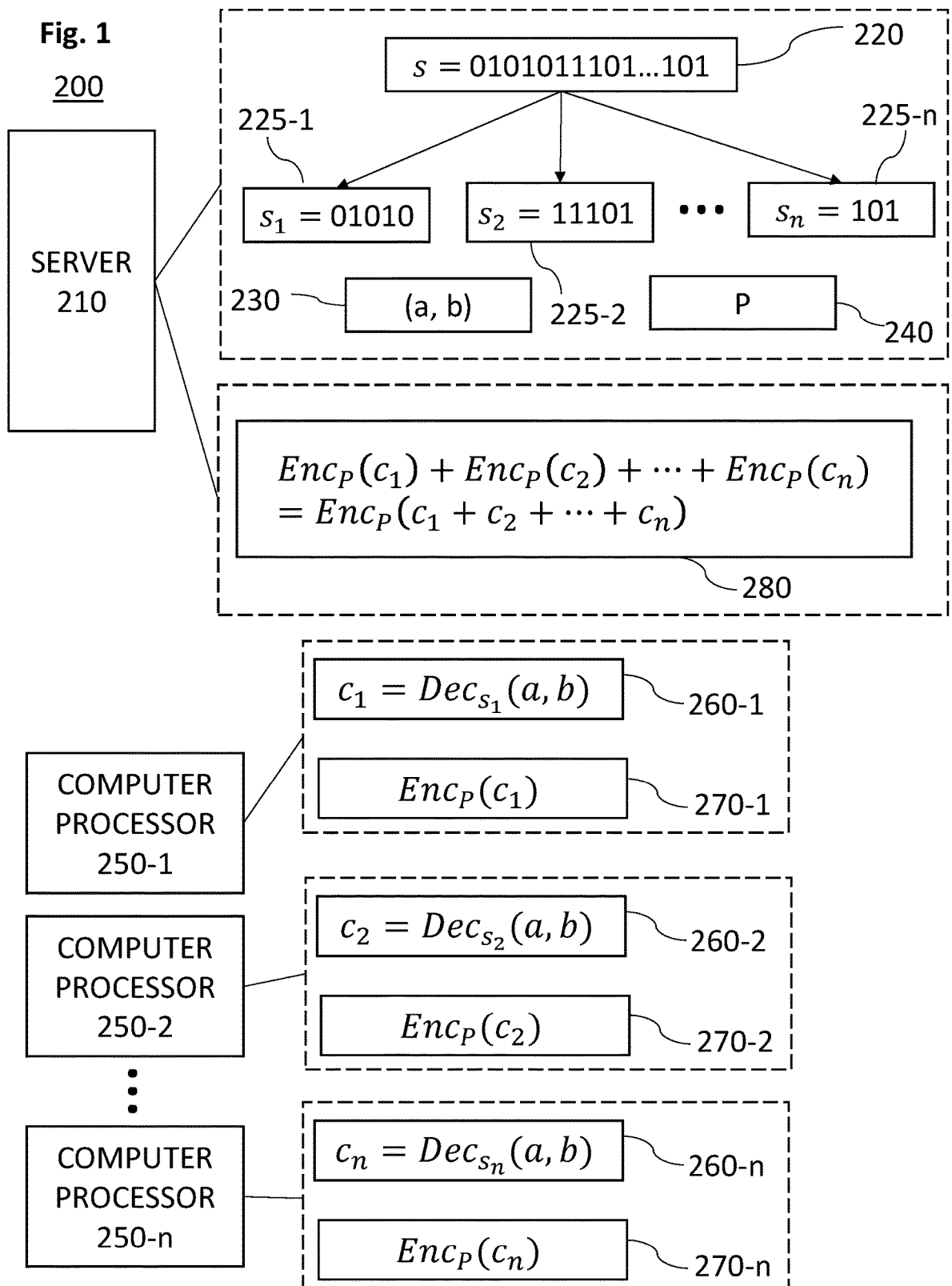
FIG. 1 is a schematic drawing of a system for distributing bootstrapping in homomorphic encryption schemes, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In general, the invention may provide systems and methods for distributing bootstrapping in homomorphic encryption schemes.

In some embodiments, the invention can involve an interactive method for bootstrapping ciphertexts encrypted using the Cheon-Kim-Kim-Song (CKKS) scheme, a homomorphic encryption scheme for approximate number arithmetic. In some embodiments, the invention can involve determining additive shares of a secret key to input to two or more semi-honest computer processors. The two or more semi-honest computer processors, having each received as input additive shares of the secret key, can each receive input of a common CKKS ciphertext, use the share of the secret key to decrypt the common CKKS ciphertext, resulting in the same (e.g., approximately the same) plaintext message underlying the ciphertext. The two or more semi-honest computer processors can compute CKKS encryption of the same (e.g., approximately the same) plaintext message underlying the ciphertext, but with a modulus larger than the ciphertext modulus. This may have the effect of increasing a plaintext space and/or reducing a relative noise.

Typically, in homomorphic encryption, the set of integers modulo q is denoted as $Z_q$, represented as integers in the range, e.g., $\{-q/2, \ldots, q/2\}$. For any power of two $N=2^k$ (k being an integer), $R=Z[X]/(X^N+1)$ may denote the corresponding cyclotomic ring, and $R_q$ may denote the quotient ring with coefficients reduced modulo q. The absolute value of a ring element |c| may be defined as the magnitude of the largest coefficient, e.g., the norm $|\vec{c}|_\infty$ of the corresponding vector. A Cheon-Kim-Kim-Song (CKKS) ciphertext with modulus q may include a pair of cyclotomic ring elements $(a, b) \in R_q^2$. A decryption key s may be a ring element $s \in R$ with small (e.g., less than 64 bits) coefficients. Small keys may be useful to, for example, perform rounded division, sign evaluation and/or comparison operations. In some embodiments, the decryption key is any $s \in R_q$ with possibly large (e.g., greater than 64 bits) entries.

Typically, in homomorphic encryption, upon input of a ciphertext (a, b) and a decryption key s, a CKKS approximate decryption function can be performed (e.g., by a computing device 100A as shown below in FIG. 2A) as follows:

1) computing the ring element $c=as+b \pmod{q} \in R_q$;
2) interpreting c(X) as a polynomial in C[X] with coefficients in $\{-q/2, \ldots, q/2\} \subset Z$; and
3) evaluating c(X) at the primitive complex roots of unity $(c(\omega), c(\omega^3), \ldots, c(\omega^{n-1}))$ to obtain n/2 complex numbers.
4) mapping n/2 complex numbers to n real numbers and rounding to integers.

Embodiments of the invention may use CKKS ciphertexts with different moduli q<Q. The CKKS encryption and decryption may also include a scaling factor $\Delta$ used to represent fixed point numbers. The first step (and typically not the remaining steps) of a CKKS decryption procedure for the CKKS encryption can depend on the modulus q. In the first step of the decryption, c can be recovered. Once c is recovered, then the remaining steps of the CKKS decryption procedure can be independent of the modulus q and/or the secret key s, which may allow the steps to be done in parallel.

Embodiments of the invention may provide a system for distributing bootstrapping in homomorphic encryption schemes.

FIG. 1 is a schematic drawing of a system 200 for distributing bootstrapping in homomorphic encryption schemes, according to some embodiments of the invention. The system 200 may be (or may include elements of) the system described in FIG. 2B.

System 200 may include a server 210 and a plurality of n computer processors 250-1, 250-2, ..., 250-n, where n is an integer, for example an integer greater than or equal to two. Server 210 may be a computing device 100A as described in FIG. 2A (e.g., host device 110, shown in FIG. 2B).

In some embodiments, each of the plurality of n computer processors are located on server 210. For example, the server and each of the plurality of n computer processors are part of the same computing device.

In some embodiments each of the plurality of n computer processors are located on a same second server (not shown in FIG. 1), e.g., a server other than server 210. For example, each of the plurality of n computer processors are part of the same computing device, but this computing device is different from server 210.

In some embodiments, each of the plurality of n computer processors are located on a corresponding plurality of n different servers. For example, each of the plurality of n computer processors are part of separate computing devices. In some embodiments, each of the plurality of n computer processors are located on a plurality of m different servers in any combination, where m is an integer. The n and/or m different servers may be semi-honest servers.

In some embodiments, server 210 is configured to split a decryption key into a plurality of n shares, where n is an integer. The number of shares n may be chosen based on the size of the ciphertext, the size of the decryption key, a number of available computer processors, a number of available computer processors trusted to perform operations with the shares securely, a desired processing time, a desired level of encryption noise, or any combination thereof. In some embodiments, n is determined by a number of participants, for example, how many banks are collaborating in situations where they are sharing data to build models of financial crime.

As shown in FIG. 1, server 210 may have stored and/or receive as input a decryption key 220 denoted s and split it into a first share 225-1 denoted $s_1$, a second share 225-2 denoted $s_2$, . . . and an nth share 225-n denoted $s_n$. The decryption key s can be a secret key. The decryption key s may be required as part of performing a decryption of a ciphertext with modulus q. Server 210 may be configured to split the decryption key. In some embodiments, the decryption key s can be split such as shown in EQN. 1:

$$s = s_1 + s_2 + \ldots + s_n \pmod{q} \qquad \text{EQN. 1}$$

Server 210 may be configured to transmit, to each of the plurality of n computer processors 250-1, 250-2, . . . , 250-n a ciphertext 230 denoted (a, b). In some embodiments, ciphertext 230 includes a pair of ring elements from a cyclotomic ring. In some embodiments, ciphertext 230 is encrypted using homomorphic encryption, for example, ciphertext 230 may be a CKKS ciphertext encrypted using the CKKS approximate homomorphic encryption scheme.

Server 210 may be configured to transmit, to each of the plurality of n computer processors 250-1, 250-2, . . . , 250-n a unique share of the plurality of n shares of the decryption key. For example, server 210 may transmit share 225-1 of decryption key 220 to computer processor 250-1, transmit share 225-2 of decryption key 220 to computer processor 250-2 etc. and transmit share 225-n of decryption key 220 to computer processor 250-n. In some embodiments, the server transmits a unique share of the plurality of n shares of the decryption key to more than one computer processor. For example, server 210 may transmit the same share 225-1 to both computer processor 250-1 and computer processor 250-2. This may allow for a redundancy in embodiments of the invention and/or allow for comparison of received results among computer processors receiving the same input information, for example in order to ensure the processors are not deviating from the operations required by embodiments of the invention.

Server 210 may be configured to transmit an indication of a publicly available encryption key 240 denoted P. The indication of the encryption key 240 may include the encryption key P itself, and/or an indication of where encryption key 240 may be accessed by the n computer processors, such as a file location and/or IP address. In some embodiments, an encryption key may have previously been distributed using any communication method known in the art, for example delivery by post of a USB drive containing the encryption key, which may then be inserted into a computing device containing one or more computer processors so that the encryption key is accessible by the one or more computer processors for use in accordance with embodiments of the invention. In some embodiments, encryption key 240 (e.g., P) corresponds to s the decryption key 220. For example, s and P may be respective decryption and encryption keys for the same encryption, with s used in undoing (e.g., decrypting) the encryption of P.

Server 210 may be configured to transmit each of (i) the ciphertext; (ii) a unique share of the plurality of n shares of the decryption key; and/or (iii) the indication of a publicly available encryption key, to each of the plurality of n computer processors substantially in parallel, for example within a bounded time period of one another such as 5 seconds or less.

Server 210 may be configured to receive, from each of the plurality of n computer processors 250-1, 250-2, . . . , 250-n, n encrypted values 270-1, 270-2, . . . , 270-n denoted $\text{Enc}_P(c_1), \text{Enc}_P(c_2), \ldots, \text{Enc}_P(c_n)$. Server 210 may receive the encrypted values substantially in parallel, for example within a bounded time period of one another such as 5 seconds or less.

In some embodiments, each of the n encrypted values is a re-encryption of a decryption of the ciphertext, and each of the plurality of n computer processors are configured to: perform the re-encryption using the publicly available encryption key; and perform the decryption of the ciphertext using the unique share of the plurality of n shares of the decryption key transmitted to the plurality of n computer processors. For example, each of the n encrypted values 270-1, 270-2, . . . , 270-n may be a re-encryption of a decryption of ciphertext 230, e.g., decryptions 260-1, 260-2, . . . , 260-n. The re-encryption may be performed by each of the plurality of n computer processors 250-1, 250-2, . . . , 250-n using publicly available encryption key 240, and the decryption of ciphertext 240 may be performed by each of the plurality of n computer processors 250-1, 250-2, . . . , 250-n using the unique share of the plurality of n shares of the decryption key transmitted to each of the plurality of n computer processors, e.g., shares 225-1, 225-2, . . . , 225-n.

For example: computer processor 250-1 may calculate a decryption 260-1 of ciphertext 230 using share 225-1 of decryption key 220 (for example evaluating $c_1 = \text{Dec}_{s_1}(a, b)$) and re-encrypt decryption 260-1 using publicly available encryption key 240 to arrive at encrypted value 270-1 (for example evaluating $\text{Enc}_P(c_1)$); computer processor 250-2 may calculate a decryption 260-2 of ciphertext 230 using share 225-2 of decryption key 220 (for example evaluating $c_2 = \text{Dec}_{s_2}(a, b)$) and re-encrypt decryption 260-2 using publicly available encryption key 240 to arrive at encrypted value 270-2 (for example evaluating $\text{Enc}_P(c_2)$), etc.; and computer processor 250-n may calculate a decryption 260-n of ciphertext 230 using share 225-n of decryption key 220 (for example evaluating $c_n = \text{Dec}_{s_n}(a, b)$) and re-encrypt decryption 260-n using publicly available encryption key 240 to arrive at encrypted value 270-n (for example evaluating $\text{Enc}_P(c_n)$). In various embodiments, all, some or any combination of the plurality of n computer processors may process received data independently of one another, without interaction with other processors of the plurality of n computer processors.

Server 210 may be configured to compute a homomorphic sum 280 of the n encrypted values 270-1, 270-2, . . . , 270-n to obtain an encryption of the sum of n decrypted values 260-1, 260-2, ..., 260-n such that a bootstrapping of the encryption is distributed (e.g., among the plurality of n computer processors). Computing the homomorphic sum may be performed as shown below in EQN. 2:

$$Enc_P(c_1)+Enc_P(c_2)+ \quad . \quad . \quad . \quad +Enc_P(c_n)= \\ Enc_P(c_1+c_2+ \ldots +c_n) \quad \quad \text{EQN. 2}$$

In some embodiments, each of the n encryption values 270-1, 270-2, ..., 270-n are independent of decryption key 220. For example, P the publicly available encryption key 240 may correspond to a different secret key than s the decryption key 220. This may allow system 200 to perform key switching.

In some embodiments, each of the plurality of n computer processors are configured to round the decryption of the ciphertext if an absolute value of the decryption of the ciphertext is greater than a predefined value. For example, computer processor 250-1 may check if an absolute value of decryption value 260-1 is greater than a predefined value, for example if $|c_1|>q/4$. If so, computer processor 250-1 may round decryption value 260-1 by performing an operation as shown below in EQN. 3:

$$c_1 \leftarrow c_1+(q/2)(\bmod q) \quad \quad \text{EQN. 3}$$

The operation may be performed coordinate-wise, on each coefficient of $c_1$ independently. Similarly, computer processor 250-2 may check if $|c_2 51 >q/4$ and, if so, may perform an operation as shown below in EQN. 4:

$$c_2 \leftarrow c_2+(q/2)(\bmod q) \quad \quad \text{EQN. 4}$$

Such checks and rounding may be performed for each computer processor such that computer processor 250-n may check if $|c_n|>q/4$ and, if so, may perform an operation as shown below in EQN. 5:

$$c_n \leftarrow c_n+(q/2)(\bmod q) \quad \quad \text{EQN. 5}$$

In some embodiments, each of the plurality of n computer processors are configured to decrypt the ciphertext using the unique share of the plurality of n shares of the decryption key transmitted to the plurality of n computer processors, and a modulus, wherein the modulus is different for each of the plurality of n computer processors. For example, ciphertext 230 is decrypted by each of the plurality of n computer processors 250-1, 250-2, ..., 250-n using the unique share of the plurality of n shares of the decryption key transmitted to the plurality of n computer processors, and a modulus. The modulus may be different for each of the plurality of n computer processor, for example computer processor 250-1 may use a modulus $q_1$, computer processor 250-2 may use a modulus $q_2$, etc. and computer processor 250-n may use a modulus $q_n$. The moduli $q_1, q_2, \ldots, q_n$ may be used by computer processors 250-1, 250-2, ..., 250-n during a check of the decrypted values 260-1, 260-2, ..., 260-n and any required rounding operations as a result of the check (e.g., described in EQNs. 3-5)

In some embodiments, the server is configured to transmit, to each of the plurality of n computer processors, a hash function to be used in the decryption of the ciphertext. For example, server 210 may transmit a hash function H: $R_q^2 \rightarrow R_q$ (e.g., modelled as a random oracle) to each of computer processors 250-1, 250-2, ..., 250-n. In some embodiments, server 210 may send a different hash function to each of the plurality of n computer processors, e.g., n hash functions $H_1, H_2, \ldots, H_n$.

Figure 2A:
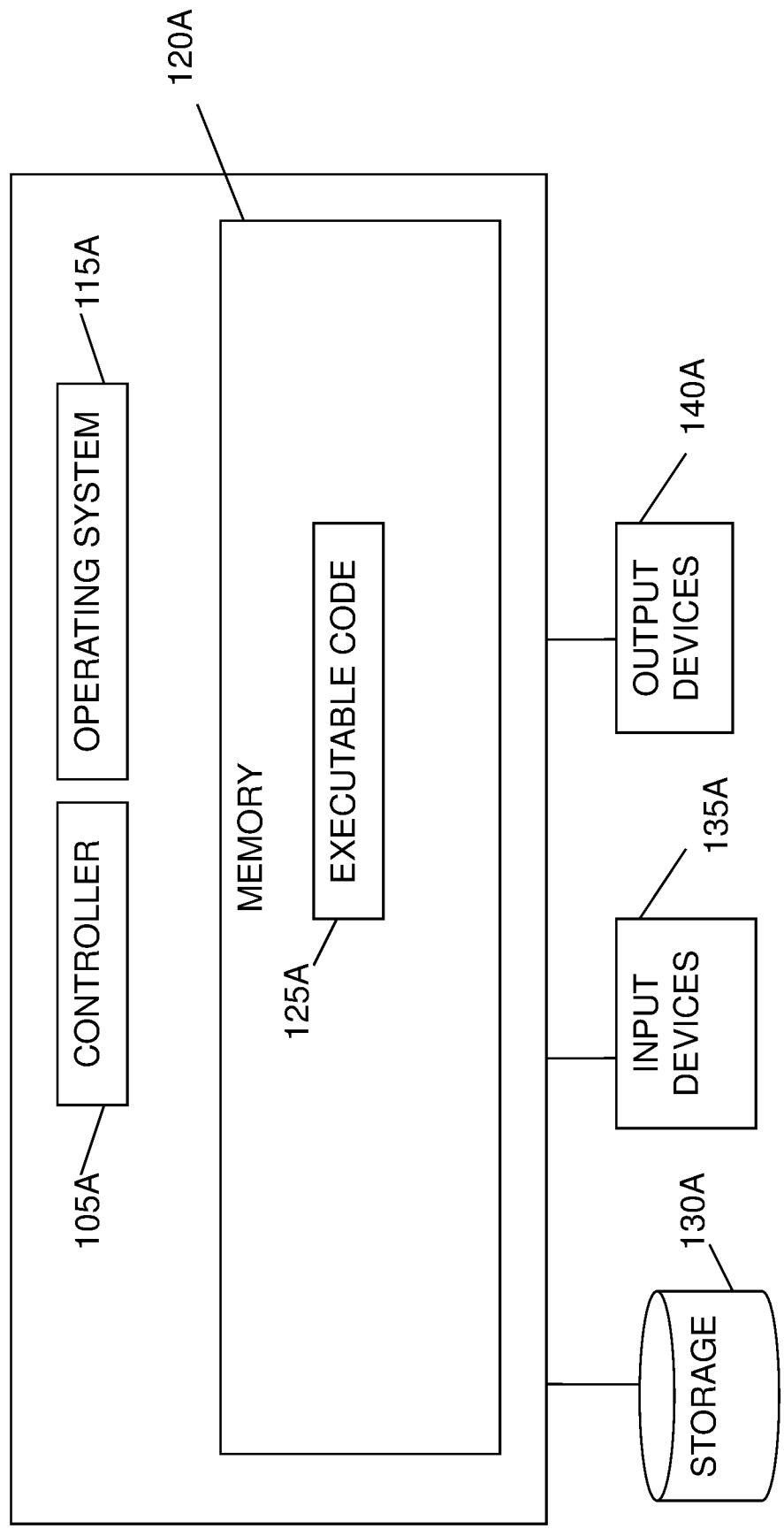
FIG. 2A is a block diagram of an exemplary computing device which may be used with embodiments of the present invention.

FIG. 2A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system. Server 210 of FIG. 1 may be (or may include), for example, a computing device 100A.

Operating system 115A may be or may include code to perform tasks involving coordination, scheduling, arbitration, or managing operation of computing device 100A, for example, scheduling execution of programs. Memory 120A may be or may include, for example, a random access memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g., code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as splitting a decryption key into a plurality of n shares. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 2B:
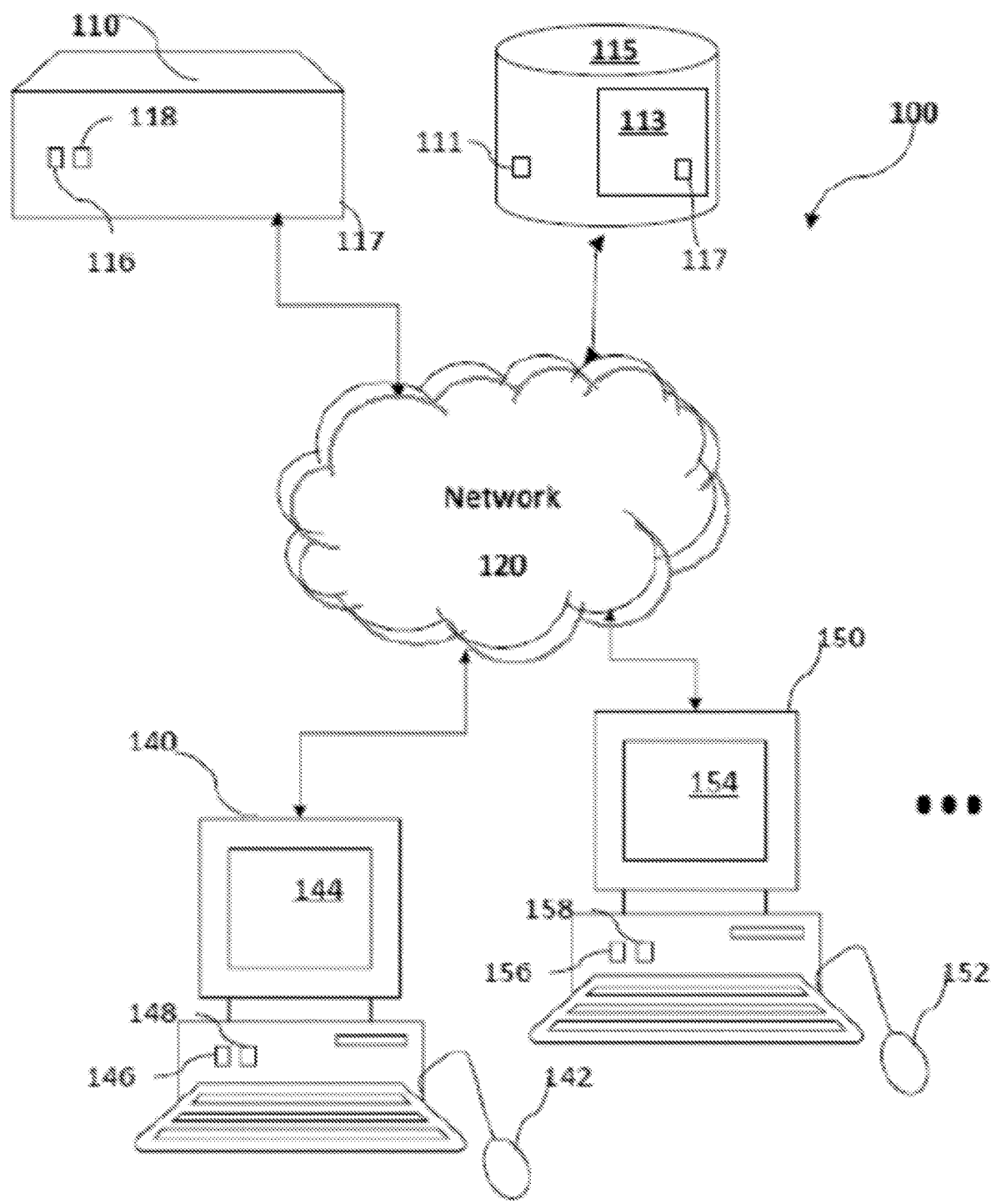
FIG. 2B is a schematic drawing of a system for distributing bootstrapping in homomorphic encryption schemes, according to some embodiments of the invention.

FIG. 2B is a schematic drawing of a system 100 according to some embodiments of the invention. System 200 of FIG. 1 may be, or may include elements of, a system such as system 100. Embodiments of the invention described herein, such as computer implemented methods, may be executed using any single or combination of devices and/or components of system 100 of FIG. 2B. The devices of system 100 may be operated by parties including one or more data owner device(s) 140, 150, . . . , one or more host device(s) 110, and one or more database(s) 115. Each party's device(s) 110, 115, 140, and 150, may include one or more server(s), storage device(s), computer(s) such as, personal computers, desktop computers, mobile computers or devices, laptop computers, and notebook computers or any other suitable device such as a cellular telephone, personal digital assistant (PDA), video game console, etc., and may include wired or wireless connections or modems.

In one implementation, host device(s) 110 may include one or more servers, database(s) 115 may include one or more storage devices comprising memory/memories 113, and data owner device(s) 140 and 150 may include one or more computers or mobile devices, such as, smart cellular telephones. Data owner device(s) 140 and 150 may include respective memories 148 and 158 for storing data owner information. Data owner device(s) 140 and 150 may include one or more input devices 142 and 152, respectively, for receiving input from a user, such as, two encrypted numbers. Data owner device(s) 140 and 150 may include one or more output devices 144 and 154 (e.g., a monitor or screen) for displaying data to the data owner provided by or for host device(s) 110. Server 210 of FIG. 1 may be (or may be part of), for example, a host device 110, and each of the plurality of n computer processors 250-1, 250-2, . . . , 250-*n* of FIG. 1 may be, or may be part of, data owner devices 140, 150, etc.

Database(s) 115 may be a storage device comprising one or more memories 113 to store encrypted data 117, such as, two encrypted numbers. In alternate embodiments, database(s) 115 may be omitted and data owner encrypted information 117 may be stored in an alternate location, e.g., exclusively in memory unit(s) 148 and 158 of the respective entity devices, or in host device memory 118.

Any or all of system 100 devices may be connected via one or more network(s) 120. Network 120 may be any public or private network such as the Internet. Access to network 120 may be through wire line, terrestrial wireless, satellite, or other systems well known in the art.

Each system device 110, 115, 140, and 150 may include one or more controller(s) or processor(s) 116, 111, 146, and 156, respectively, for executing operations according to embodiments of the invention and one or more memory unit(s) 118, 113, 148, and 158, respectively, for storing data (e.g., client information, server shares, private keys, public keys, etc.) and/or instructions (e.g., software for applying computations or calculations to encrypt data, to decrypt data, and other operations according to embodiments of the invention) executable by the processor(s).

Processor(s) 116, 111, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 113, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

FIG. 3 shows a computer implemented method 300 for distributing bootstrapping in homomorphic encryption schemes, according to an embodiment of the invention. Method 300 may be implemented by one or more elements of systems 200, 100A, and/or 100 as shown in FIGS. 1, 2, and 3, respectively.

Method 300 may include splitting, by a server, a decryption key into a plurality of n shares (Step 302), where n is an integer. The server may be a server such as server 210 described in FIG. 1. In some embodiments, n is greater than or equal to two. The decryption key may be a decryption key 220 described in FIG. 1.

Method 300 may include transmitting, by the server, to each of a plurality of n computer processors: (i) a ciphertext, wherein the ciphertext is encrypted using homomorphic encryption; (ii) a unique share of the plurality of n shares of the decryption key; and (iii) an indication of a publicly available encryption key (Step 304).

The plurality of n computer processors may be computer processors such as computer processors 250-1, 250-2, . . . , 250-*n* described in FIG. 1. In some embodiments, each of the plurality of n computer processors are located on the server. In some embodiments, each of the plurality of n computer processors are located on a same second server (e.g., a different server from the server that performs Steps 302 and 304). In some embodiments, each of the plurality of n computer processors are located on a corresponding plurality of n different servers. In some embodiments, each of the plurality of n computer processors are located on a plurality of m different servers in any combination, where m is an integer. The plurality of n and/or m different servers may be semi-honest servers.

The ciphertext may be a ciphertext such as ciphertext 230 described in FIG. 1. In some embodiments, the ciphertext is encrypted using the Cheon-Kim-Kim-Song (CKKS) approximate homomorphic encryption scheme. In some embodiments, the ciphertext comprises a pair of ring elements from a cyclotomic ring.

A unique share of the plurality of n shares of the decryption key may be a unique share such as one of unique shares 225-1, 225-2, . . . , 225-*n* described in FIG. 1.

The indication of the publicly available encryption key may include the encryption key itself and/or an indication of where the publicly available encryption key may be accessed by each of the n computer processors, such as a file location or IP address. The encryption key may be an encryption key such as encryption key 240 shown in FIG. 1.

As part of Step 304, the server may transmit data to each of the plurality of n computer processors substantially in parallel, for example within a bounded time period of one another such as 5 seconds or less.

Method 300 may include receiving, by the server, from each of the plurality of n computer processors, n encrypted values (Step 306). Each of the n encrypted values may be a re-encryption of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors. The encrypted values may be encrypted values such as encrypted values 270-1, 270-2, . . . , 270-*n* shown in FIG. 1, and the decrypted values may be decrypted values such as decrypted values 260-1, 260-2, . . . , 260-*n* shown in FIG. 1. The server may receive the encrypted values substantially in parallel, for example within a bounded time period of one another such as 5 seconds or less.

Method 300 may include computing, by the server, a homomorphic sum of the n encrypted values to obtain an encryption of the sum of n decrypted values, such that a bootstrapping of the encryption is distributed (Step 308).

The homomorphic sum may be a homomorphic sum such as homomorphic sum 208 shown in FIG. 1 and expressed in EQN. 2.

In some embodiments, method 300 may include a case where the ciphertext is decrypted by each of the plurality of n computer processors using the unique share of the plurality of n shares of the decryption key transmitted to the plurality of n computer processors, and a modulus. The modulus may be different for each of the plurality of n computer processors, for example a first modulus $q_1$, a second modulus $q_2$, etc. and an nth modulus $q_n$.

As part of method 300, each of the n encryption values may be independent of the decryption key. For example, the publicly available encryption key may correspond to a different secret key than the decryption key, which may allow method 300 to perform key switching.

In some embodiments, method 300 includes rounding the decryption of the ciphertext if an absolute value of the decryption of the ciphertext is greater than a predefined value. The rounding may be as described above with reference to EQNs. 3-5.

Method 300 may include transmitting, by the server, to each of the plurality of n computer processors, a hash function. The transmitting may be performed as part of Step 304 of FIG. 3. The decryption of the ciphertext (e.g., by the plurality of n computer processors) may include using the hash function. The hash function may be a hash function H: $R_q^2 \rightarrow R_q$ (e.g., modelled as a random oracle). In some embodiments, the server may send a different hash function to each of the plurality of n computer processors, e.g., n hash functions $H_1, H_2, \ldots, H_n$.

According to one or more embodiments of the invention, there is provided a computer program product containing instructions which, when executed by at least one processor (such as a processor in a server) cause the at least one processor to carry out methods described herein.

For example, the instructions may cause a server to: split a decryption key into a plurality of n shares; transmit, to each of a plurality of n (e.g. different) computer processors: (i) a ciphertext, wherein the ciphertext is encrypted using homomorphic encryption; (ii) a unique share of the plurality of n shares of the decryption key; and (iii) an indication of a publicly available encryption key; receive, from each of the plurality of n computer processors, n encrypted values; and compute a homomorphic sum of the n encrypted values to obtain an encryption of the sum of n decrypted values.

In embodiments where one or more of the plurality of n computer processors are located on the same server/computing device, the instructions of the computer program product may instruct the plurality of n computer processors to carry out the methods disclosed herein, for example to cause each of the plurality of n computer processors are to: perform the re-encryption using the publicly available encryption key; and perform the decryption of the ciphertext using the unique share of the plurality of n shares of the decryption key transmitted to the plurality of n computer processors.

The methods and systems described herein may be adapted to any linearly homomorphic output encryption scheme and/or may be used to perform key switching and encryption scheme switching.

EXAMPLES

Embodiments of the invention may be further understood by reference to the following examples.

Assume an example that lets $s \in R$ be a CKKS secret key modulo q and P a CKKS public key modulo Q (here P may correspond to the same secret key s, or a different one: this makes no difference for the example or the applicability of embodiments of the invention).

Embodiments of the invention may solve the following example bootstrapping problem: Given a CKKS ciphertext $(a, b) \subset R_q^2$ which encrypts a message $c = Dec_s(a, b) = as+b$ (with $|c| < \beta$), how to obtain a CKKS encryption $Enc_P(c)$ of the same (encoded) message c under P. As will be known to those skilled in the art, $\beta$ may represent a noise parameter typically fixed based on security standards.

Embodiments of the invention may solve the above example bootstrapping problem using a method (such as method 300 described with respect to FIG. 3) where two servers $S_0$, $S_1$ hold shares of the secret key modulo q. The shares may be determined based on EQN 6 below:

$$s = s_0 + s_1 \pmod{q} \qquad \text{EQN. 6}$$

With reference to method 300 and system 200, this example sets n=2, and uses two computer processors located on servers $S_0$, $S_1$. A convention of counting from zero, e.g., $S_0$ for the first server and $S_1$ for the second server may be used to aid in the mathematics when referring to a general index $i \in \{0, 1\}$, as can be seen.

The servers may also receive the public key P modulo Q, and receive the input ciphertext (a, b), from a client C (in this example, server 210 of FIG. 1, the server performing steps 302-308 of method 300, is referred to as the client C). Without any interaction, e.g., independent of one another, the servers $S_0$, $S_1$ may compute two respective encryptions $Enc_P(c_0)$, $Enc_P(c_1)$ and send them to the client C. This may correspond to step 306 of method 300, described with reference to FIG. 3.

The client C may compute a homomorphic sum according to EQN. 7 below:

$$Enc_P(c_0) + Enc_P(c_1) = Enc_P(c_0 + c_1) \qquad \text{EQN. 7}$$

Here, $Enc_P$ may be a CKKS encryption using a larger modulus Q, or any other linearly homomorphic public key encryption scheme.

Embodiments of the invention may be used to increase a plaintext modulus of a ciphertext, and may also be used to switch between different encryption keys, or even between different encryption schemes.

Example 1: Protocol for CKKS Bootstrapping

Let $i \in \{0, 1\}$ be the index of server $S_i$. Each server may perform the following operations:
1) Global parameters: key share $s_i \in R_q$, public key P (mod Q), hash function H: $R_q^2 \rightarrow R_q$ modelled as a random oracle;
2) Common input (for both servers): ciphertext $(a, b) \in R_q^2$;
3) Compute a randomizer $r = H(a, b)$;
4) Compute $c_i = as_i + i \cdot b + (-1)^i \cdot r \pmod{q}$. Equivalently, the two servers compute $c_0 = as_0 + r$ and $c_1 = as_1 + b - r$;
5) If $|c_i| > q/4$, then $c_i \leftarrow c_i + (q/2) \pmod{q}$. The operations are performed coordinate-wise, on each coefficient of $c_i$ independently.
6) Return $Enc_P(c_i)$ In the above example protocol, the value $c_i$ may be computed as a polynomial with integer coefficients bounded by $|c_i| \leq q/2$. Upon receiving $Enc_P(c_0)$ and $Enc_P(c_1)$, the client C (e.g., server 210 of FIG. 1) adds them up to obtain $Enc_P(c_0 + c_1)$.

In this example, each coefficient of $c_i$ may satisfy $|c_i| \notin (q/4 \pm \beta)$, where $|c| < \beta$ by assumption. When, q is larger by approximately 40 bits than $\beta$, the protocol may reduce a total noise of the bootstrapping. For typical implementations of CKKS, which typically perform all operations in the residue number system (RNS), this relationship between q and $\beta$ suggests an extra RNS modulus can be added to the modulus, typically resulting in two RNS limbs in the ciphertext before calling an interactive bootstrapping procedure such as described herein, as compared to a single RNS limb in the case of noninteractive CKKS bootstrapping.

Example 2: Protocol Based on Threshold FHE

In this example, it is assumed that there is an existing protocol (e.g., method 300) with two parties (although any number of parties may be used). In this example, each party has a secret key share generated from the ternary uniform distribution. The secret shares may be labelled as $s_0$ and $s_1$. The party that has $s_0$ (referred to as "client" in this example) may encrypt its data using a joint public key generated using an existing distributed key generation protocol for threshold FHE. The party that has $s_1$ (referred to as "server" in this example) may perform HE computations. In this example, the client and server $S_1$ of Example 1 correspond to the client here in this Example 2, and server $S_0$ of Example 1 corresponds to the server in this Example 2.

To perform interactive bootstrapping, the following protocol may be executed:

1) Server performs HE computations yielding a ciphertext $(a, b) \in R_q^2$;
2) Server computes $c_0 = as_0 + b$;
3) Server performs rounding: if $|c_0| > q/4$, then $c_0 \leftarrow c_0 + (q/2) \pmod{q}$. The operations are performed coordinate-wise, on each coefficient of $c_0$ independently.
4) Client computes $c_1 = as_1$;
5) Client performs rounding: if $|c_1| > q/4$, then $c_1 \leftarrow c_1 + (q/2) \pmod{q}$. The operations are performed coordinate-wise, on each coefficient of $c_1$ independently.
6) Client encrypts $c_1$ as $Enc_P(c_1)$, and sends it to the server
7) Server computes $Enc_P(c_1) + c_0$ to obtain the desired ciphertext Example 3: Protocol Based on Threshold FHE with Rerandomization This example is a modification of Example 2, where a ciphertext rerandomization may be added. One option is to do the rerandomization of the input ciphertext before starting the main bootstrapping protocol. The modified protocol may be executed as follows:

1) Server performs HE computations yielding a ciphertext $(a', b') \in R_q^2$. Then the server adds the public key encryption of 0: $(a, b) = (a', b') + Enc_P(0)$. The server sends the ciphertext $(a, b)$ to the client;
2) Server computes $c_0 = as_0 + b$;
3) Server performs rounding: if $|c_0| > q/4$, then $c_0 \leftarrow c_0 + (q/2) \pmod{q}$. The operations are performed coordinate-wise, on each coefficient of $c_0$ independently.
4) Client computes $c_1 = as_1$;
5) Client performs rounding: if $|c_1| > q/4$, then $c_1 \leftarrow c_1 + (q/2) \pmod{q}$. The operations are performed coordinate-wise, on each coefficient of $c_1$ independently.
6) Client encrypts $c_1$ as $Enc_P(c_1)$, and sends it to the server
7) Server computes $Enc_P(c_1) + c_0$ to obtain the desired ciphertext Another option is to rerandomize interactively using the secret shares of each party, similar to the protocol for generating the joint public key in threshold FHE.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A computer implemented method for distributing bootstrapping in homomorphic encryption schemes, the method comprising:
   splitting, by a server, a decryption key into a plurality of n shares, where n is an integer;
   transmitting, by the server, to each of a plurality of n computer processors:
      (i) a ciphertext, wherein the ciphertext is encrypted using homomorphic encryption;
      (ii) a unique share of the plurality of n shares of the decryption key; and
      (iii) an indication of a publicly available encryption key;
   receiving, by the server, from each of the plurality of n computer processors, n encrypted values,
   wherein each of the n encrypted values is a re-encryption of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors; and
   computing, by the server, a homomorphic sum of the n encrypted values to obtain an encryption of the sum of n decrypted values, such that a bootstrapping of the encryption is distributed,
   wherein the ciphertext is decrypted by each of the plurality of n computer processors using the unique share of the plurality of n shares of the decryption key transmitted to the plurality of n computer processors, and a modulus, wherein the modulus is different for each of the plurality of n computer processors.

2. The method of claim 1, wherein each of the plurality of n computer processors are located on the server.

3. The method of claim 1, wherein each of the plurality of n computer processors are located on a same second server.

4. The method of claim 1, wherein each of the plurality of n computer processors are located on a corresponding plurality of n different servers.

5. The method of claim 4, wherein each of the plurality of n different servers are semi-honest servers.

6. The method of claim 1, wherein the ciphertext is encrypted using the Cheon-Kim-Kim-Song (CKKS) approximate homomorphic encryption scheme.

7. The method of claim 1, wherein the ciphertext comprises a pair of ring elements from a cyclotomic ring.

8. The method of claim 1, wherein each of the n encryption values are independent of the decryption key.

9. The method of claim 1, wherein the decryption of the ciphertext is rounded if an absolute value of the decryption of the ciphertext is greater than a predefined value.

10. The method of claim 1, wherein the server transmits, to each of the plurality of n computer processors, a hash function, and
wherein the decryption of the ciphertext comprises the hash function.

11. A system for distributing bootstrapping in homomorphic encryption schemes, the system comprising:
   a server; and
   a plurality of n computer processors, where n is an integer,
   wherein the server is configured to:
      split a decryption key into a plurality of n shares;
      transmit, to each of the plurality of n computer processors:
         (i) a ciphertext, wherein the ciphertext is encrypted using homomorphic encryption;
         (ii) a unique share of the plurality of n shares of the decryption key; and
         (iii) an indication of a publicly available encryption key;
      receive, from each of the plurality of n computer processors, n encrypted values,
      wherein each of the n encrypted values is a re-encryption of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors; and
      compute a homomorphic sum of the n encrypted values to obtain an encryption of the sum of n decrypted values, such that a bootstrapping of the encryption is distributed,
      wherein the ciphertext is decrypted by each of the plurality of n computer processors using the unique share of the plurality of n shares of the decryption key transmitted to the plurality of n computer processors, and a modulus, wherein the modulus is different for each of the plurality of n computer processors.

12. The system of claim 11, wherein each of the plurality of n computer processors are located on the server.

13. The system of claim 11, wherein each of the plurality of n computer processors are located on a same second server.

14. The system of claim 11, wherein each of the plurality of n computer processors are located on a corresponding plurality of n different servers.

15. The system of claim 11, wherein each of the plurality of n computer processors are configured to round the decryption of the ciphertext if an absolute value of the decryption of the ciphertext is greater than a predefined value.

16. The system of claim 11, wherein the server is configured to transmit, to each of the plurality of n computer processors, a hash function to be used in the decryption of the ciphertext.

17. A computer readable non-transitory storage medium storing instructions which when executed by at least one processor in a server cause the at least one server to:
split a decryption key into a plurality of n shares, where n is an integer;
transmit, to each of a plurality of n computer processors:
(i) a ciphertext, wherein the ciphertext is encrypted using homomorphic encryption;
(ii) a unique share of the plurality of n shares of the decryption key; and
(iii) an indication of a publicly available encryption key;
receive, from each of the plurality of n computer processors, n encrypted values,
wherein each of the n encrypted values is a re-encryption of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors; and
compute a homomorphic sum of the n encrypted values to obtain an encryption of the sum of n decrypted values, such that a bootstrapping of the encryption is distributed,
wherein the ciphertext is decrypted by each of the plurality of n computer processors using the unique share of the plurality of n shares of the decryption key transmitted to the plurality of n computer processors, and a modulus, wherein the modulus is different for each of the plurality of n computer processors.

* * * * *